United States Patent
Reinert (10) Patent No.: US 12,530,505 B1
(45) Date of Patent: Jan. 20, 2026

(54) DYNAMIC RECONFIGURATION OF EMBEDDED NETWORKS (DREN)

(71) Applicant: Fleet Defender, Inc., Springfield, NE (US)

(72) Inventor: Terry Reinert, Springfield, NE (US)

(73) Assignee: Fleet Defender, Inc., Springfield, NE (US)

( * ) Notice: Subject to any disclaimer, the term of this patent is extended or adjusted under 35 U.S.C. 154(b) by 378 days.

(21) Appl. No.: 18/222,919

(22) Filed: Jul. 17, 2023

Related U.S. Application Data (60) Provisional application No. 63/389,598, filed on Jul. 15, 2022.

(51) Int. Cl.
*G06F 21/75* (2013.01)
*G06F 21/60* (2013.01)
*G06F 21/85* (2013.01)

(52) U.S. Cl.
CPC ............ *G06F 21/75* (2013.01); *G06F 21/602* (2013.01); *G06F 21/85* (2013.01)

(58) Field of Classification Search
CPC ......... G06F 21/75; G06F 21/602; G06F 21/85
See application file for complete search history.

(56) References Cited

U.S. PATENT DOCUMENTS

| | | | |
|---|---|---|---|
| 6,577,684 B1* | 6/2003 | Hirano | H04L 25/4919 375/264 |
| 2008/0163247 A1* | 7/2008 | Musial | G07F 7/082 719/313 |
| 2020/0180524 A1* | 6/2020 | Deschênes | H04L 41/0806 |
| 2022/0050628 A1* | 2/2022 | Basu | G06F 3/0688 |
| 2022/0131683 A1* | 4/2022 | Choi | H04L 9/088 |
| 2023/0169849 A1* | 6/2023 | Kim | G08G 1/04 701/117 |

OTHER PUBLICATIONS

Islam R, Refat Ru. Improving CAN bus security by assigning dynamic arbitration IDs. Journal of Transportation Security. Jun. 2020; 13(1):19-31. (Year: 2020).*

* cited by examiner

*Primary Examiner* — Lynn D Feild
*Assistant Examiner* — Ethan V Vo
(74) *Attorney, Agent, or Firm* — Suiter Swantz IP (57) ABSTRACT

An adapter increases the resiliency and security of protocols used for communication between embedded systems on a network. The adapter actively protects against reverse engineering and exploitation. The adapter allows embedded systems to actively thwarting cyber-attacks in real-time while allowing the embedded system to continue operating in mission ready status.

19 Claims, 5 Drawing Sheets

DYNAMIC RECONFIGURATION OF EMBEDDED NETWORKS (DREN)

CROSS-REFERENCE TO RELATED APPLICATION

The present application claims the benefit under 35 U.S.C. § 119(e) of U.S. Provisional Application Ser. No. 63/389,598, filed Jul. 15, 2022, titled "DYNAMIC RECONFIGURATION OF EMBEDDED NETWORKS (DREN)", which is incorporated herein by reference in the entirety.

TECHNICAL FIELD

The present invention generally relates to the transmission and protection of digital information, and more particularly to transmission and protection of digital information on bus networks.

BACKGROUND

Embedded systems have strict timing requirements to process inputs, make decisions, and perform actions in real time. Communication protocols used to transmit data between controllers in an embedded system must adhere to strict timing requirements. As a result of the timing requirements, these protocols cannot afford the processing cost of implementing typical information technology (IT) authentication and encryption security features, leaving the protocol vulnerable to cyber-attack.

The controller area network (CAN) protocol is an example of a communication protocol. Nodes on a CAN network transmit messages on the same physical wiring. These messages contain, among other data items, an arbitration identifier and a data payload. The arbitration identifier is used to arbitrate communications between the nodes and to identify the message to each node on the bus. Each node that receives the message uses the arbitration identifier to determine if the node needs to process this message and what the format of the data payload is. A threat actor may spoof messages and disrupt the system by reverse engineering the traffic on the CAN bus to understand the arbitration identifiers and payload formats. Therefore, it would be advantageous to provide a device, system, and method that cures the shortcomings described above.

SUMMARY

An adapter is described in accordance with one or more embodiments of the present disclosure. The adapter includes a first connector. The adapter includes a second connector. The adapter includes a power circuit. The adapter includes a tapped power and ground line. The tapped power and ground line are connected from the first connector to the power circuit and to the second connector in parallel. The adapter includes a processor. The adapter includes one or more tapped data lines. The one or more tapped data lines are connected from the first connector to the second connector via the processor. The processor is configured to execute program instructions. The program instructions cause the processor to receive a message over at least one of the first connector or the second connector via the one or more tapped data lines. The program instructions cause the processor to change a format of the message. The program instructions cause the processor to transmit the change of the format over at least one of the first connector or the second connector via the one or more tapped data lines. The program instructions cause the processor transmit the message using the format over at least one of the first connector or the second connector via the one or more tapped data lines.

In some embodiments, changing the format of the message comprises at least one of reassigning an arbitration scheme of the message, changing a layout of a payload or a data field of the message, or changing an encoding of data within the payload of the message.

In some embodiments, changing the format of the message comprises reassigning the arbitration scheme of the message.

In some embodiments, the message is a controller area network (CAN) message. The arbitration scheme of the message is reassigned between bitwise arbitration schemes.

In some embodiments, changing the format of the message comprises changing the layout of the payload or the data field of the message.

In some embodiments, the message is a controller area network (CAN) message. Changing the layout of the payload or the data field of the message comprises changing between a classic CAN message and a CAN flexible data-rate (CAN FD) message.

In some embodiments, changing the format of the message comprises changing the encoding of data within the payload of the message.

In some embodiments, the message is changed between non-return-to-zero (NRZ) bit coding and the return-to-zero (RZ) bit coding.

In some embodiments, transmitting the change of the format comprises transmitting an encrypted message.

In some embodiments, the adapter includes a processor board comprising the processor and the power circuit. The adapter includes an interface board comprising the first connector and the second connector. The processor board and the interface board are connected by a board-to-board connector.

In some embodiments, the processor board and the interface board are configured to decouple.

In some embodiments, the board-to-board connector is a card edge connector.

In some embodiments, the adapter comprises one or more passed-through data lines. The one or more passed-through data lines are directly connected between the first connector to the second connector without connecting to the processor.

In some embodiments, the first connector is configured to connect to a network. The second connector is configured to connected to an embedded device.

In some embodiments, the processor comprises at least one of field programmable gate array (FPGA) or a microcontroller.

In some embodiments, the program instructions are maintained in at least one of software or firmware.

A system is described in accordance with one or more embodiments of the present disclosure. The system includes a network. The system includes an embedded device. The system includes an adapter. The adapter includes a first connector. The first connector is connected to the network. The adapter includes a second connector. The second connector is connected to the embedded device. The adapter includes a power circuit. The adapter includes a tapped power and ground line. The tapped power and ground line are connected from the first connector to the power circuit and to the second connector in parallel. The adapter includes a processor. The adapter includes one or more tapped data lines. The one or more tapped data lines are connected from the first connector to the second connector via the processor.

The processor is configured to execute program instructions. The program instruction cause the processor to receive a message from the network over the first connector via the one or more tapped data lines or from the embedded device over the second connector via the one or more tapped data lines. The program instruction cause the processor to change a format of the message. The program instruction cause the processor to transmit the change of the format to the network over the first connector via the one or more tapped data lines or to the embedded device over the second connector via the one or more tapped data lines. The program instruction cause the processor to transmit the message using the format to the network over the first connector via the one or more tapped data lines or to the embedded device over the second connector via the one or more tapped data lines.

In some embodiments, changing the format of the message comprises at least one of reassigning an arbitration scheme of the message, changing a layout of a payload or a data field of the message, or changing an encoding of data within the payload of the message.

In some embodiments, the system includes a plurality of embedded devices and a plurality of adapters.

A processor board is described in accordance with one or more embodiments of the present disclosure. The processor board includes a board-to-board connector. The processor board includes a power circuit. The processor board includes a tapped power and ground line connected from the board-to-board connector to the power circuit. The processor board includes a processor. The processor board includes one or more tapped data lines. The one or more tapped data lines are connected from the board-to-board connector to the processor. The processor is configured to execute program instructions. The program instructions cause the processor to receive a message over the board-to-board connector via the one or more tapped data lines. The program instructions cause the processor to change a format of the message. The program instructions cause the processor to transmit the change of the format over the board-to-board connector via the one or more tapped data lines. The program instructions cause the processor to transmit the message using the format over the board-to-board connector via the one or more tapped data lines.

In some embodiments, changing the format of the message comprises at least one of reassigning an arbitration scheme of the message, changing a layout of a payload or a data field of the message, or changing an encoding of data within the payload of the message.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed software, firmware, and/or hardware for protecting networks of embedded devices from cyber-attack. The software, firmware, and/or hardware increase the resiliency and security of protocols used for communication between embedded systems and actively protect against reverse engineering and exploitation. The software, firmware, and/or hardware allow the embedded systems to "fight through" cyber-attacks. In this regard, the software, firmware, and/or hardware may actively thwart the attacks in real-time while allowing the system to continue operating in mission ready status. For example, the software, firmware, and/or hardware implement Dynamic Reconfiguration of Embedded Networks (DREN). Dynamic Reconfiguration of Embedded Networks (DREN) may be implemented as software and/or firmware. The software may include one or more algorithms. The algorithms may be integrated into firmware. As used herein, any of the software functions may be implemented by firmware of any number of nodes of the network, such as nodes of embedded devices, nodes of adapters, and the like. For example, the hardware may be an embedded device which may include software and/or firmware with the DREN algorithm. By way of another example, the hardware may be a hardware adapter which may include the software and/or firmware with the DREN.

Figure 1:
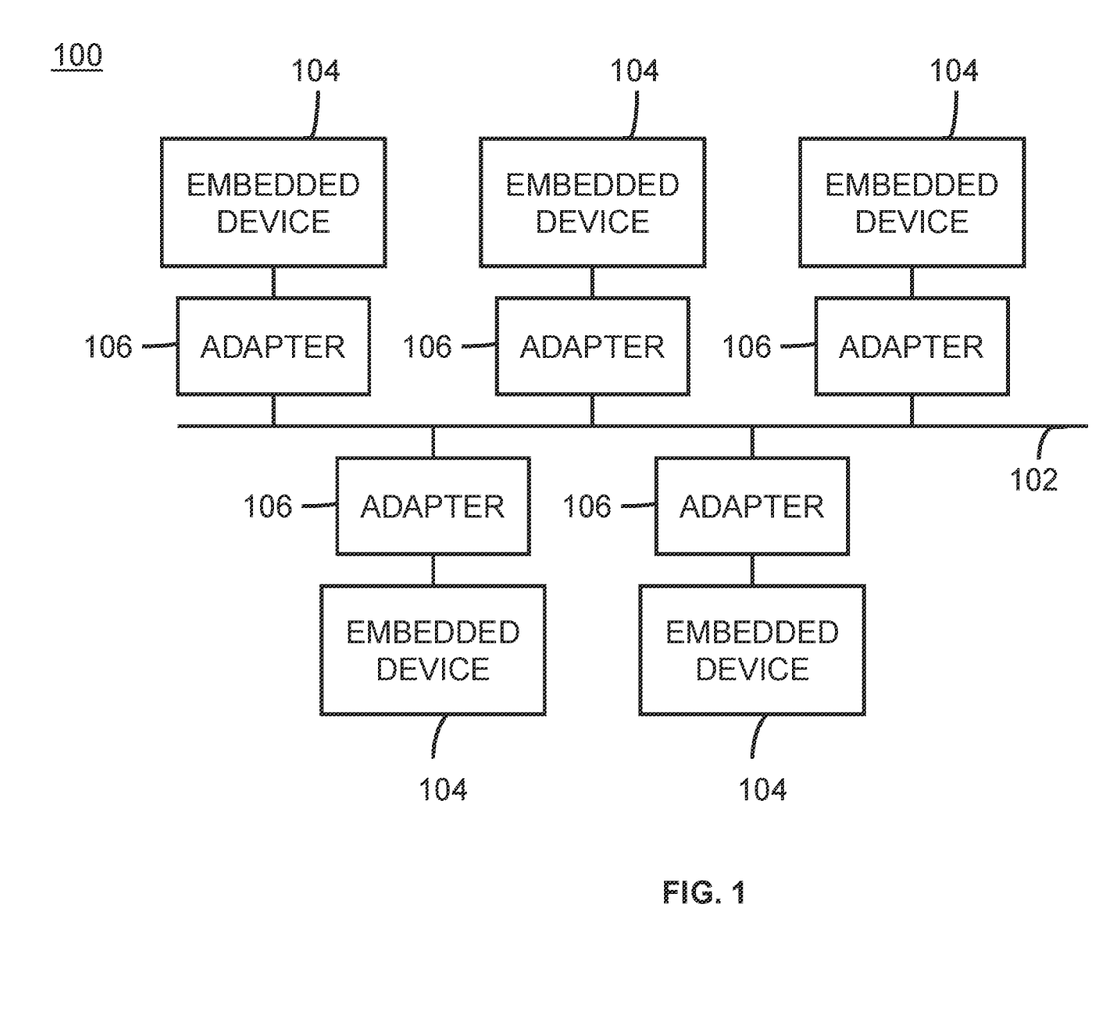
FIG. 1 illustrates a diagram of a system including a network, one or more embedded devices, and one or more adapters, in accordance with one or more embodiments of the present disclosure.

Referring now to FIG. 1, a system 100 is described, in accordance with one or more embodiments of the present disclosure. The system 100 may also be referred to as an embedded system. The system 100 may include a network 102, one or more embedded devices 104, and one or more adapters 106.

In some instances, the system 100 may be housed within a vehicle or platform. The platform may refer to a movable platform. In this regard, the system 100 may be incorporated into any sea, air, land, or space platform. For example, the platform may include, but is not limited to, ground platforms, trains, air platforms, fixed wing aircraft, rotorcraft, surface vessels, underwater vessels, manned spacecraft, unmanned spacecraft, and the like. It is further contemplated that the system 100 may be housed outside of a movable platform, such that the recitations of the various platforms are not intended to be limiting. For example, the system may be incorporated into any stationary platforms, such as, but not limited to, industrial equipment, building networks, railway networks, industrial control systems (ICS), and the like.

The network 102 may also be referred to as a physical network medium, a bus network, or the like. The network 102 may follow one or more networking protocols. The networking protocols may be selected from embedded networking protocols, serial network protocols, and the like. For example, the network 102 may be a controller area network (CAN) bus, a J1939 bus, or the like. The CAN bus may include one or more twisted pairs of wires. The CAN bus may include may include any suitable format, such as, but not limited to, CAN 2.0A including a 11-bit identifier, CAN 2.0B including a 29-bit identifier, ISO 11898-1, ISO 11898-2, ISO 11898-3, or CAN FD 1.0 (CAN with flexible data rate). The format may also include one or more of an arbitration field and a data field. Although the network 102 is described as being a CAN bus, this is not intended as a limitation of the present disclosure. It is further contemplated that the network be applicable to other formats. For example, the network 102 may include, but is not limited to, SAE J1939, CAN, Military Standard 1553 (MIL-STD-1553), ethernet (e.g., automotive ethernet), RS-232, RS-422, ModBus, BACNET, Spacewire, IEC 60870-5, MQTT, Profibus, DNP3, Open Platform Communications (OPC), and the like.

The system 100 includes one or more of the embedded devices 104. The embedded device 104 may also be referred to as an electronic control unit, and/or a node of the network 102. The embedded device 104 includes one or more microcontrollers or microprocessors that execute embedded software. The embedded software may be domain specific and vary according to the application of the system 100. For example, the embedded device 104 may be an electronic control unit (ECU) where the system 100 is housed within a vehicle. The electronic control unit may include any of a Powertrain ECU, Door control unit, anti-lock brake system (ABS), Battery management system (BMS), and the like.

The system 100 also includes one or more of the adapters 106. The adapters 106 may also be referred to as Dynamic Reconfiguration of Embedded Networks (DREN) adapters. The adapters 106 connect the embedded devices 106 to the network 102. In this regard, the adapters 106 are connected between the embedded devices 104 and the network 102. The adapters 106 adapt the embedded devices 104 to the network 102.

The adapter 106 acts as a secure proxy between the embedded device 104 and the network 102. The adapters 106 implement a dynamic reconfiguration of embedded network (DREN) algorithm by which the adapters 106 are configured to function as an in-line data tap between the network 102 and the embedded device 104. In embodiments, the adapter 106 is configured to execute a method for dynamically reconfiguring an architecture of the data bus. For example, the adapter 106 may be configured to execute one or more steps of the method 300. Messages are routed through the adapter 106. The adapter 106 receives the messages and changes features of the protocol, such as message identifiers, data payload formats, and message encoding.

The adapter 106 actively disrupts reverse engineering and exploitation attempts on embedded communication networks in real-time. The adapter 106 ensures network traffic to the embedded device 104 is secured. The adapter 106 also maintains an operational integrity of the system 100.

In some embodiments, one or more threat actors may be connected to the network 102. The threat actors may include live attackers in the network 102, embedded malware, and the like. The threat actors may attempt to receive and decode the messages on the network 102. However, the threat actors connected to the network 102 are unaware of the change in the format. The threat actors may then be unable to decode the messages transmitted over the network 102.

Figure 2A:
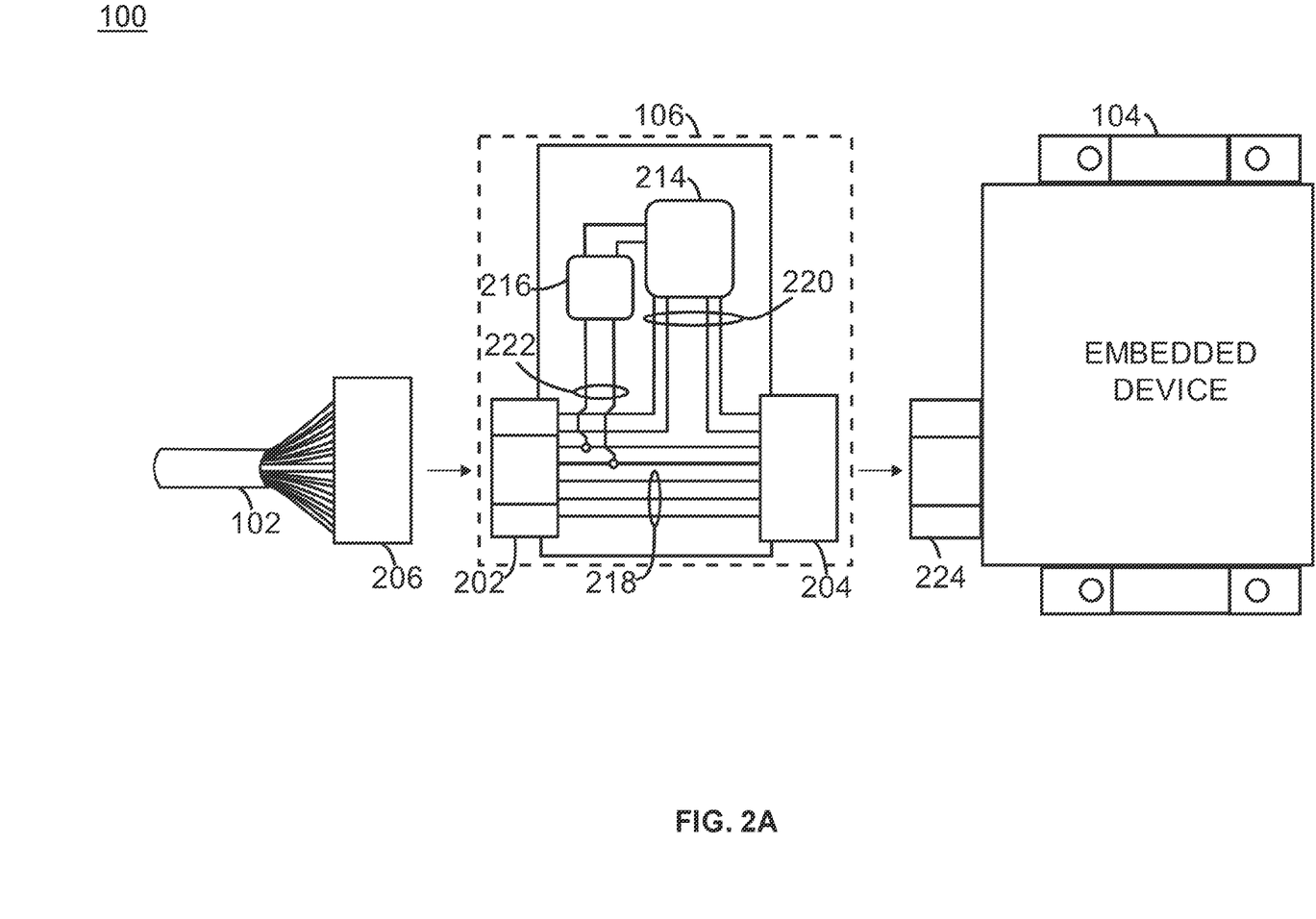
FIG. 2A depicts an adapter, in accordance with one or more embodiments of the present disclosure.
Figure 2B:
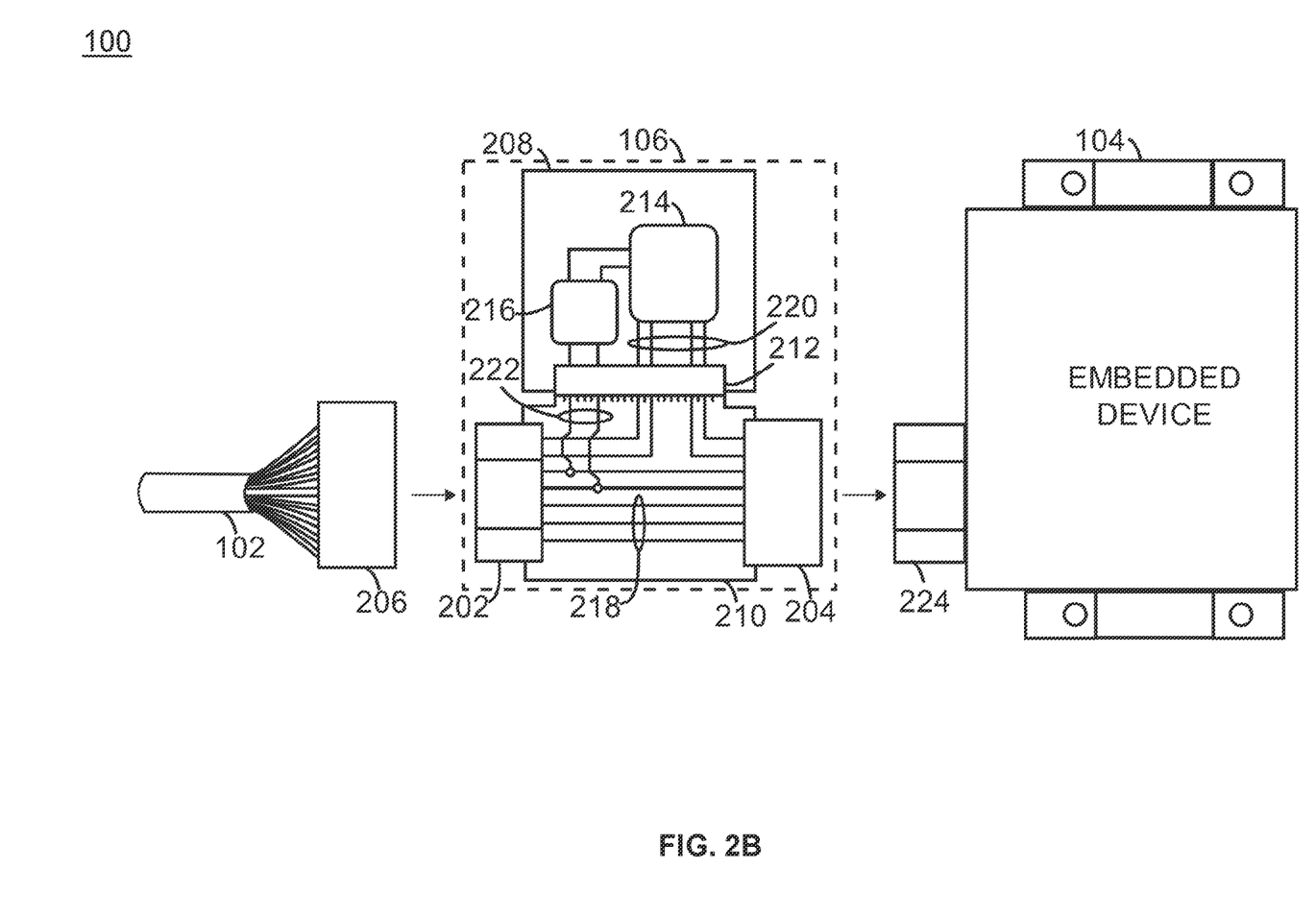
FIG. 2B depicts an adapter including an interface board and a processor board, in accordance with one or more embodiments of the present disclosure.

Referring now to FIGS. 2A-2B, the adapter 106 is described, in accordance with one or more embodiments of the present disclosure. The adapter 106 includes one or more components, such as, but not limited to, connector 202, connector 204, processor 214, power circuit 216, one or more passed-through data lines 218, one or more tapped data lines 220, tapped power and ground line 222, and the like.

The adapter 106 includes the connector 202. The connector 202 is configured to connect the adapter 106 to the network 102. For example, the connector 202 is configured to connect the adapter 106 to a connector 206 of the network 102. The connector 202 may also be referred to as a network connector or a first connector. In this example, the network 102 is depicted as including a wiring harness terminating in the connector 206.

The adapter 106 includes the connector 204. The connector 204 is configured to connect the adapter 106 to the embedded device 104. For example, the connector 204 is configured to connect the adapter 106 to a connector 224 of the embedded device 104. The connector 204 may also be referred to as an embedded device connector or a second connector.

The connector 202 and the connector 204 may include plugs (i.e., a male connector), jacks (i.e., a female connector), and the like. As may be understood, the connector 202 and the connector 204 may generally include any combination of male/female connectors suitable for connecting between the network 102 and the embedded device 104.

In some embodiments, the connector 202 and the connector 204 are opposite gendered (e.g., male-to-female; female-to-male). In this regard, the adapter 106 is not a gender changer between the embedded device 104 and the network 102. In some embodiments, the connector 202 and the connector 204 are the same gendered (e.g., male-to-male; female-to-female). In this regard, the adapter 106 is a gender changer between the embedded device 104 and the network 102.

The connector 202 and connector 204 may include any type of network connector. For example, the connector 202 and/or the connector 204 may include, but are not limited to, a D-subminiature type connector (e.g., a 9-pin D-sub type connector), OBD connectors, RJ-type connectors (e.g., an RJ45 connector), USB connectors, and the like. The connector 202 and the connector 204 are depicted as being 7-pin connectors, although this is not intended to be limiting. The specific type of network connector for the connector 202 and connector 204 is not intended to be limiting. In some embodiments, the connector 202 is a same type of network connector as the connector 204. In some embodiments, the connector 202 is a different type of network connector than the connector 204.

The one or more passed-through data lines 218, one or more tapped data lines 220, tapped power and ground line 222 are connected between the connector 202 and the connector 204. For example, the one or more passed-through data lines 218, one or more tapped data lines 220, tapped power and ground line 222 are connected between pins of the connector 202 and the connector 204. The adapter 106 is depicted as including three of the passed-through data lines 218, two of the tapped data lines 220, and the tapped power and ground line 222 corresponding to the seven pins of the connector 202 and connector 204, although this is not intended to be limiting.

The passed-through data lines 218 are lines which transmit messages. The passed-through data lines 218 are directly connected between the connector 202 to the connector 204 without connecting to the processor 214. In this regard, the data lines of the passed-through data lines 218 are passed-through or avoid the processor 214. The passed-through data lines 218 pass that do not require DREN transformation from the network 102 to the embedded device 104 and from the embedded device 104 to the network 102.

The tapped power and ground line 222 includes a power line and a ground line. The tapped power and ground line 222 is connected from the connector 202 to the power circuit 216 and the connector 204 in parallel. For example, the tapped power and ground line 222 receive power from the network 102 via the connector 202. The power is shared in parallel between the power circuit 216 and the embedded device 104 via the connector 204.

The power circuit 216 taps the tapped power and ground line 222. The power circuit 216 taps the power from the tapped power line of the tapped power and ground line 222 to power the processor 214. The power circuit 216 is connected to the processor 214. The power circuit 216 provides the power to the processor 214. The power circuit 216 may also be referred to as a power management integrated circuit (PMIC), power management unit (PMU), or the like. The power circuit 216 may provide one or more functions, such as, but limited to voltage conversion (e.g., AC-to-DC conversion, DC-to-DC conversion, and the like). The power circuit 216 then provides the processor 214 with a select voltage (e.g., 5 V, 3.3 V, 1.8 V, and the like). The power circuit 216 may also include one or more batteries.

The tapped data lines 220 are lines which transmit messages. The tapped data lines 220 are connected from the connector 202 to the connector 204 via the processor 214. The tapped data lines 220 are connected between the connector 202 and the processor 214 and subsequently connected between the processor 214 and the connector 204. The tapped data lines 220 route unsecure messages between the network 102 and the embedded device 104 for DREN conversion. The tapped data lines 220 also route DREN-converted messages between the processor 214 and the network 102.

The processor 214 receives and manages communication between the network 102 and the embedded device 104. The processor 214 is connected to the tapped data lines 220. The processor 214 is configured to receive one or messages over the tapped data lines 220. The processor 214 may implement a DREN algorithm on the message. The processor 214 is configured to execute program instructions causing the processor 214 to perform one or more steps in the DREN algorithm. For example, the processor 214 may receive the message over the tapped data lines 220, the processor 214 may change a format of the message, transmit the change of format over the connector 202 or the connector 204 via the tapped data lines 220, and transmit the message using the format over the connector 202 or the connector 204 via the tapped data lines 220. The processor 214 may include an ability to send/receive messages, execute the DREN algorithm, and perform DREN transformations without impacting the real-time operation of the embedded device 104.

The processor 214 may include any processor architecture, such as, but not limited to, a variety of FPGAs, microcontrollers, an ARM processor (e.g., a RISC-based ARM or an XScale processor), an ASIC, PLD (Programmable Logic Device), DSP, other microelectronic components, and the like. For example, the processor 214 may be a field programmable gate array (FPGA). The FPGA may be a preferred implementation where the network 102 is configured according to a Controller Area Network (CAN) protocol. In this regard, any node on the network 102 can take control of communication through arbitration. The CAN protocol may require the ability to analyze and transform data as the data arrives on an individual bit level. By way of another example, the processor 214 may include a microcontroller. The microcontroller may be beneficial for asymmetric control (e.g., master-slave) communication architectures and for securing endpoints using fewer communication interfaces.

Referring now to FIG. 2B, the adapter 106 is described in accordance with one or more embodiments of the present disclosure. In some embodiments, the adapter 106 is modular. In embodiments, the adapter 106 may include one or more boards (e.g., printed circuit boards). The adapter 106 may be configured to be modular by the one or more boards. For example, the adapter 106 may include a processor board 208 and an interface board 210. The processing capability of the adapter 106 is located on the processor board 208. The interface capability of the adapter 106 is located on the interface board 210.

The processor board 208 may include one or more components, such as the connector 212, processor 214, power circuit 216, one or more tapped data lines 220, and tapped power and ground line 222.

The interface board 210 may also be referred to as a custom connector and data tap board. The interface board 210 may include one or more components, such as the connector 202, the connector 204, connector 212, one or more passed-through data lines 218, one or more tapped data lines 220, tapped power and ground line 222. The interface board 210 is configured to connect to the network 102 by the connector 202. The interface board 210 is configured to connect to the embedded device 104 by the connector 204.

The processor board 208 and the interface board 210 are connected by a connector 212. The connector 212 connects the processor board 208 and the interface board 210. In some embodiments, the connector 212 is a board-to-board connector. The connector 212 may include any board-to-board connector, such as, but not limited to, a card edge connector, header connector, mezzanine connector, backplane connector, and the like. The connector 212 is depicted as a card edge connector, although this is not intended to be limiting. It is contemplated that the where the connector 212 is the header connector, the processor board 208 and the interface board 210 may be arranged in a stacked configuration.

The connector 212 connects the power circuit 216 to the tapped power and ground line 222. The processor board 208 includes the tapped power and ground line 222 connected from the connector 202 to the connector 212 and to the connector 204 in parallel. The interface board 210 includes the tapped power and ground line 222 connected from the connector 212 to the power circuit 216. Thus, the tapped power and ground line 222 are connected from the connector 202 to the connector 204 and to the connector 212 to the power circuit 216 in parallel.

The connector 212 connects the processor 214 to the tapped data lines 220. The interface board 210 includes the tapped data lines 220 connected between the connector 202 and the connector 212 and subsequently connected between the connector 212 and the connector 204. The processor board 208 includes the tapped data lines 220 connected between the connector 212 and the processor 214 and subsequently connected between the processor 214 and the connector 212. Thus, the tapped data lines 220 are connected from the connector 202 to the connector 212, to the processor 214, to the connector 212, to the connector 204.

The adapter 106 may to be applied to a variety of networks 102 and/or embedded devices 104 with minimal redesign of the processor board 208 by the modularity of the interface board 210. The interface board 210 may be decoupled from the processor board 208. A second interface board is then coupled to the processor board 208 via the connector 212. The connector 212 may remain the same when the interface board 210 is decoupled and the second interface board is coupled. The second interface board routes signals to the pins of the connector 212 via the tapped data lines 220. The processor 214 may continue to receive messages over the tapped data lines 220 without changing the functionality of the processor board 208.

The second interface board includes the connector 202 and/or the connector 204 having a same or different type of network connector. In this regard, the second interface board includes a different type of network connectors (i.e., different connector 202 and/or connector 204). The type of network connector is selected depending upon the design of the network 102 and the embedded device 104. In this regard, the interface board 210 enables a dynamically reconfigurable data bus architecture.

Thus, the processor board 208 includes a single design which may be coupled with multiple designs for the interface board 210. Separating the functionality between the processor board 208 and the interface board 210 may be beneficial to allow the processor board 208 to be implemented with many of the interface boards 210. Separating the functionality may be particularly advantageous, where the processing components are relatively more complex than the interface components. The interface board 210 may thus be more feasibly be redesigned and manufactured in small batches. The modularity facilitates more robust operation and aids in manufacturing at scale.

Figure 3:
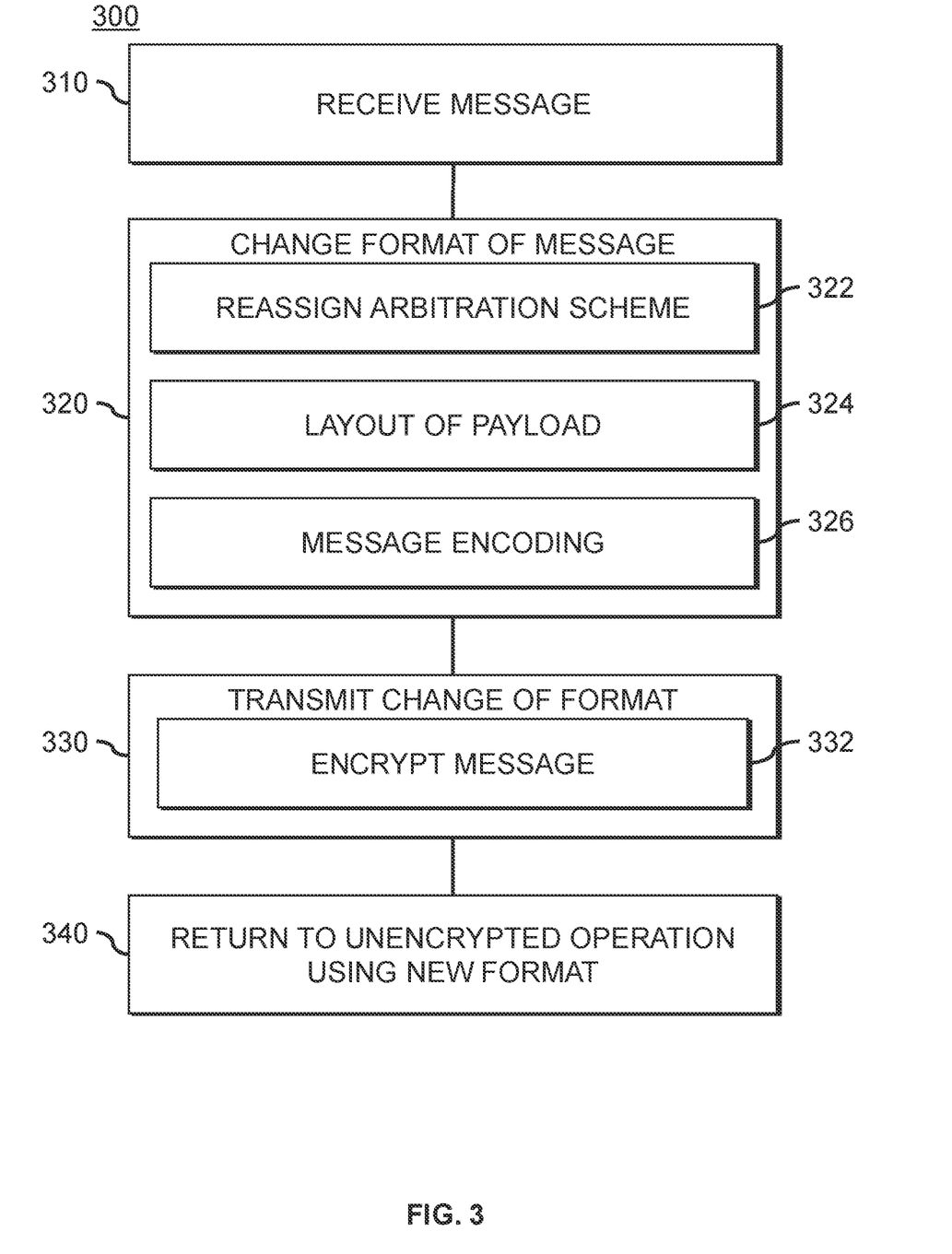
FIG. 3 illustrates a flow diagram of a method for Dynamic Reconfiguration of Embedded Networks (DREN), in accordance with one or more embodiments of the present disclosure.

Referring now to FIG. 3, a method 300 is described, in accordance with one or more embodiments of the present disclosure. The method 300 may also be referred to as a method of dynamic reconfiguration of embedded networks.

In a step 310, a message is received over the tapped data lines 220. The message is received by the processor 214. The message is received over at least one of the connectors 202 or the connector 204 via the tapped data lines 220. The message is received from either the network 102 or the embedded device 104. In this regard, the message is received from the network 102 over the connector 202 via the tapped data lines 220 or from the embedded device 104 over the connector 204 via the tapped data lines 220. In some embodiments, the message is received over the connector 212 via the tapped data lines 220.

In a step 320, a format of the message is changed. The format of the message is changed to actively thwart malicious threats. Any threat actors on the network 102 are unaware of the change in format. In some instances, the change to the format may be made in real-time. For example, the change to the format may be within several milliseconds. Changing the format includes any of reassigning an arbitration scheme, changing a layout of a payload or data field, and/or changing an encoding of data within the payload.

In a step 322, changing the format of the message includes reassigning an arbitration scheme. The arbitration scheme may be reassigned from a first arbitration scheme to a second arbitration scheme.

For example, the messages may be CAN messages. The CAN messages may include one or more identifier bits (e.g., an 11-bit identifier or a 29-bit identifier). The CAN messages may follow a bit-wise arbitration based on higher or lower binary identifiers. The arbitration scheme of the message may be reassigned between bitwise arbitration schemes. In standard bit-wise arbitration, binary identifiers with a lower value have a higher priority. An identifier with all zeros is then a highest priority message. Therefore, if two of the embedded devices 104 transmit simultaneously, the embedded device 104 with the lowest binary identifier retains control of the network 102. The standard bit-wise arbitration may be changed to reverse bit-wise arbitration. In reverse bit-wise arbitration, binary identifiers with a higher value have a higher priority. An identifier with all ones is then a highest priority message. The format of the message may be changed between the standard bitwise arbitration scheme and the reverse bit-wise arbitration scheme. Alternative arbitration schemes for CAN messages are contemplated, but are not described herein.

The arbitration scheme is not intended to be limited to a CAN arbitration scheme, where the message is formatted according to a protocol other than a CAN protocol. For example, the messages may be any one of SAE J1939, CAN, Military Standard 1553 (MIL-STD-1553), ethernet (e.g., automotive ethernet), RS-232, RS-422, ModBus, BACNET, Spacewire, IEC 60870-5, MQTT, Profibus, DNP3, OPC, and the like. Any one of the SAE J1939, CAN, Military Standard 1553 (MIL-STD-1553), ethernet (e.g., automotive ethernet), RS-232, RS-422, ModBus, BACNET, Spacewire, IEC 60870-5, MQTT, Profibus, DNP3, and/or OPC may include an arbitration scheme which may be reassigned.

In a step 324, changing the format includes changing a layout of the payload or data field of the message. The payload or data field of the message is changed to change a length of the message.

For example, the message may be a CAN message. The CAN message may be a classic CAN message with a payload of between 0 and 64 bits (8 bytes) of data per message. The CAN message may be a CAN flexible data-rate (CAN FD) message with a payload of 0 bytes, 8 bytes, 12 bytes, 16 bytes, 20 bytes, 24 bytes, 32 bytes, 48 bytes, or 64 bytes. Changing the layout of the payload may include change between the classic CAN message and the CAN FD message, although this is not intended as a limitation of the present disclosure.

Additionally, the layout of the message is not intended to be limited to a CAN layout, where the message is formatted according to a protocol other than a CAN protocol. By way of another example, the messages may be any one of SAE J1939, CAN, Military Standard 1553 (MIL-STD-1553), ethernet (e.g., automotive ethernet), RS-232, RS-422, ModBus, BACNET, Spacewire, IEC 60870-5, MQTT, Profibus, DNP3, OPC, and the like. Any one of the SAE J1939, CAN, Military Standard 1553 (MIL-STD-1553), ethernet (e.g., automotive ethernet), RS-232, RS-422, ModBus, BACNET, Spacewire, IEC 60870-5, MQTT, Profibus, DNP3, and/or OPC may include a layout which may be changed.

In a step 326, changing the format includes changing an encoding of data within a payload of the message. The format of the messages are changed from a first bit coding format to a second bit coding format. Encoding may refer to a process of converting data in the message into a format compatible with transmission over a physical network bus. The message may be encoded from a digital format into an electrical signal for transmission over a physical layer (e.g., the network 102). For example, the messages may be encoded by non-return-to-zero (NRZ) bit coding and return-to-zero (RZ) bit coding. The messages may be changed between the NRZ bit coding and the RZ bit coding.

In NRZ bit coding, binary-one is represented as a positive voltage and binary-zero is either represented as a no voltage (i.e., unipolar NRZ bit coding) or negative voltage (i.e., polar NRZ bit coding). The electrical signal remains at the positive voltage during the bit period of the binary-one.

In RZ bit coding, binary-one is represented as a positive voltage and binary-zero is either represented as a no voltage (i.e., unipolar RZ bit coding) or negative voltage (i.e., polar RZ bit coding). The electrical signal returns from the positive voltage to zero voltage during the bit period of the binary-one. In the polar RZ bit coting, the electrical signal returns from the negative voltage to zero voltage during the bit period of the binary-zero.

In a step 330, the changes of the format are transmitted. The changes of the format are transmitted via the tapped data lines 220. For example, the changes of the format are transmitted over at least one of the connectors 202 or the connector 204 via the tapped data lines 220. The changes of the format are transmitted from the processor 214 to the connector 202 and/or the connector 204 via the tapped data lines 220. The changes of the format may be subsequently transmitted over the connector 202 to the network 102 and to one or more embedded devices 104 connected to the network 102. In this regard, the changes of the format are transmitted to the network 102 over the connector 202 via the one or more tapped data lines 220 or to the embedded device 104 over the connector 204 via the tapped data lines 220. The changes of the format may also be subsequently transmitted over the connector 204 to the embedded device 104 connected to the adapter 106. Thus, the network 102, the embedded devices connected to the network 102, and the embedded device 104 connected to the adapter 106 may receive the change to the format. In some embodiments, the changes of the format are transmitted over the connector 212 via the tapped data lines 220.

The changes of the format transmitted include the change in the arbitration scheme, the change in the layout of the payload or data field of the message, and/or the change of the encoding of data within the payload. The changes of the format may be transmitted in an unencrypted message or in an encrypted message.

In a step 332, the changes to the format are encrypted into an encrypted message. The encrypted message is then transmitted over the connector 202 and/or the connector 204 via the tapped data lines 220. By the encrypted message, a threat actor will be unaware of the new format even if the threat actor is monitoring traffic. The encrypted message may be encrypted by an encryption format. In some instances, the encryption format may be an encryption format which is compatible with communications by CAN bus, although this is not intended to be limiting. Thus, transmitting the change of the format including transmitting an encrypted message.

In a step 340, transmit the message using the format over at least one of the connectors 202 or the connector 204 via the tapped data lines 220. The message is transmitted from the processor 214 to the connector 202 and/or the connector 204 via the tapped data lines 220. The message may be subsequently transmitted over the connector 202 to the network 102 and to one or more embedded devices 104 connected to the network 102. The message may also be subsequently transmitted over the connector 204 to the embedded device 104 connected to the adapter 106.

In some embodiments, the network 102, the embedded devices connected to the network 102, and/or the embedded device 104 connected to the adapter 106 may transmit a received message to the adapter 106 in response to the network 102, the embedded devices connected to the network 102, and/or the embedded device 104 receiving the changes to the format transmitted over at least one of the connector 202 or the connector 204.

In some embodiments, the adapter 106 may transmit an acknowledge message in response to receiving the received message. Thus, the adapter 106 may implement some form of a handshake protocol. In some embodiments, the message transmitted using the format may be transmitted in response to both to receiving the received message and transmitting the acknowledge message. The adapter 106 may return to an unencrypted operation using the new format. The node may return to the unencrypted operation using the new format once the changes have been communicated (e.g., transmitted, received, acknowledge, etc.).

Figure 4:
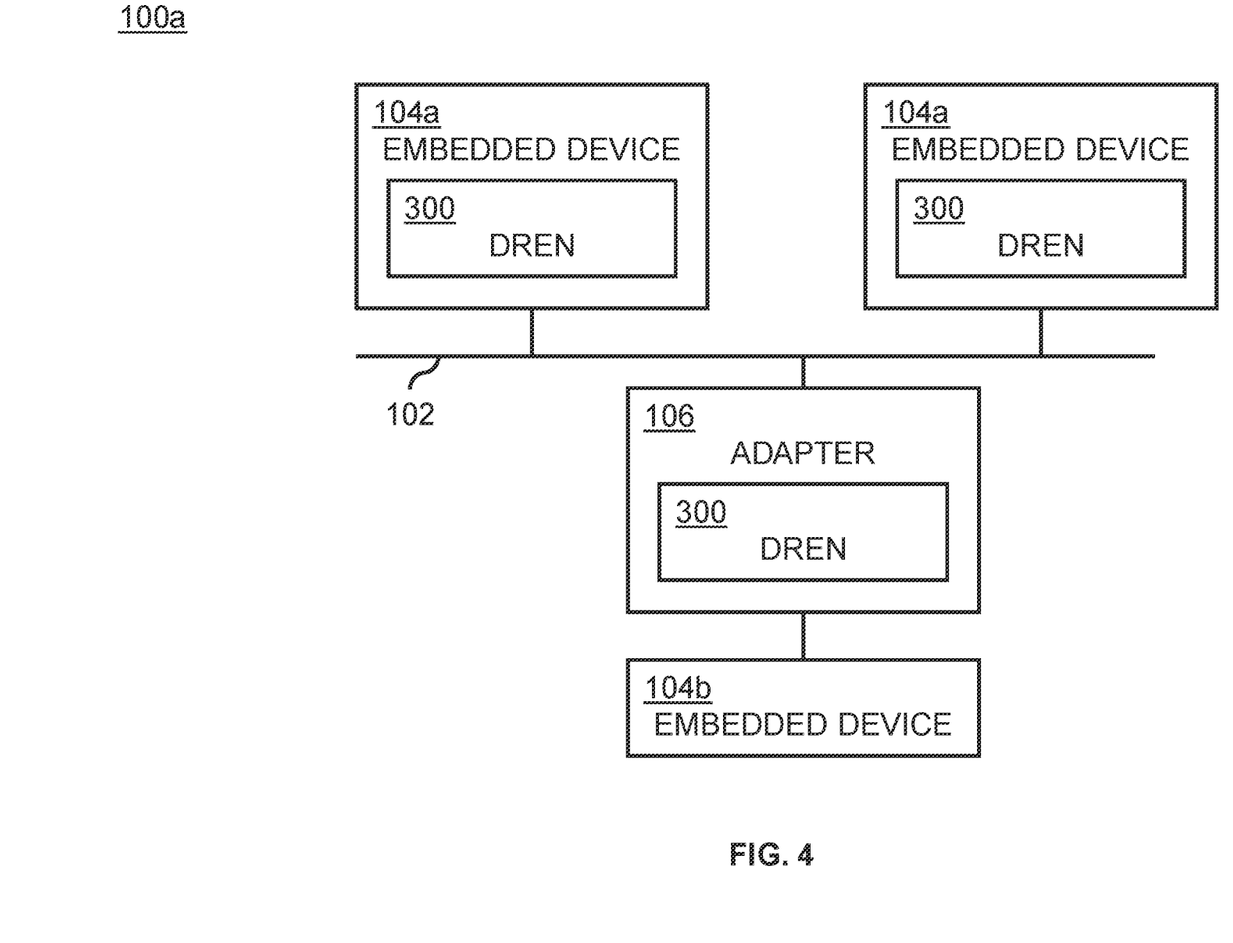
FIG. 4 illustrates a diagram of a system including a network, one or more embedded devices, and one or more adapters, in accordance with one or more embodiments of the present disclosure.

Referring now to FIG. 4, a system 100*a* is described in accordance with one or more embodiments of the present disclosure. The system 100*a* may be similar to the system 100. The system 100*a* may include the network 102 and embedded devices 104*a*. In embodiments, the embedded devices 104*a* may be configured to execute a method for dynamically reconfiguring an architecture of the data bus. For example, the embedded devices 104*a* may be configured to execute one or more steps of the method 300. In this regard, the embedded devices 104*a* may be include software, firmware, and/or hardware to actively thwart the threats without the need for the adapter 106. As may be understood, the system 100*a* may further include some combination of the embedded devices 104*a* which are configured to execute the method 300 and embedded devices 104*b* which are connected to the adapter 106 for executing the method 300, depending upon the configuration of the embedded device 104 and/or the network 102.

Referring generally again to FIGS. 1-4, the adapter 106 may be enclosed in a case (not depicted). The case may be a rigid, environment-proof case. The case protects the components of the adapter 106 from hazardous environments where the embedded devices 104 are deployed.

Although the adapter 106 is described as including the passed-through data lines 218, this is not intended as a limitation of the present disclosure. In some embodiments, all the data lines of the adapter 106 are the one or more tapped data lines 220. In this embodiment, the adapter 106 does not include any of the passed-through data lines 218.

As may be understood, the physical dimensions of the adapter 106 (e.g., the processor board 208, the interface board 210, and the like) are not intended to be limiting. The physical dimensions of the adapter 106 may be dependent on the electronic components and connectors used. In some instances, the physical dimensions may be minimized. Minimizing the physical dimensions may reduce a footprint of the adapter 106 which may similarly reduce the physical impact on the space where the embedded device 104 is deployed.

Although the adapter 106 is described as including the processor board 208 and the interface board 210, this is not intended as a limitation of the present disclosure. For example, the adapter 106 may include a single PCB with the various functionality of both the processor board 208 and the interface board 210. However, the processor board 208 and the interface board 210 may be beneficial in improving the modularity of the adapter 106.

It is contemplated that the adapter 106 may be beneficial for aftermarket applications. For example, a firmware of the embedded device 104 may be substantially inaccessible. The adapter 106 may be applied as an aftermarket security solution for securing communication on the embedded devices 104. The adapter 106 is integrated as a physical tap between the network 102 and the embedded device 104.

In some embodiments, the embedded device 104 may be communicatively connected to a host computer (not depicted), or the like, by way of the network 102.

In some embodiments, the processor 214 may implement the DREN algorithm for multiple communication channels in parallel.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory. In one embodiment, the memory may be located remotely with respect to the physical location of the one or more processors. In this regard, the results may be maintained in a remote server (i.e., a cloud server).

The one or more processors may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). The program instructions are maintained in at least one of software or firmware. In one embodiment, the one or more processors may be embodied as a desktop computer, mainframe computer system, workstation, image computer, parallel processor, networked computer, or any other computer system configured to execute a program configured to operate or operate in conjunction with the system, as described throughout the present disclosure.

The memory may include any storage medium known in the art suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a magnetic tape, a solid-state drive and the like. It is further noted that memory medium may be housed in a common controller housing with the one or more processors. In one embodiment, the memory medium may be located remotely with respect to the physical location of the one or more processors. For instance, the one or more processors may access a remote memory (e.g., server), accessible through a network (e.g., internet, intranet and the like).

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An adapter comprising:
   a first connector;
   a second connector;
   a power circuit;
   a tapped power and ground line; wherein the tapped power and ground line are connected from the first connector to the power circuit and to the second connector in parallel;
   a processor; and
   one or more tapped data lines; wherein the one or more tapped data lines are connected from the first connector to the second connector via the processor;
   wherein the processor is configured to execute program instructions causing the processor to:
      receive a message over at least one of the first connector or the second connector via the one or more tapped data lines; wherein the message is a controller area network (CAN) message;
      change a format of the message; wherein changing the format of the message comprises reassigning an arbitration scheme of the message; wherein the arbitration scheme of the message is reassigned between bitwise arbitration schemes;
      transmit the change of the format over at least one of the first connector or the second connector via the one or more tapped data lines; and
      transmit the message using the format over at least one of the first connector or the second connector via the one or more tapped data lines.

2. The adapter of claim 1, wherein changing the format of the message additionally comprises at least one of changing a layout of a payload or a data field of the message, or changing an encoding of data within the payload of the message.

3. The adapter of claim 2, wherein changing the format of the message comprises changing the layout of the payload or the data field of the message.

4. The adapter of claim 3, wherein the message is a controller area network (CAN) message; wherein changing the layout of the payload or the data field of the message comprises changing between a classic CAN message and a CAN flexible data-rate (CAN FD) message.

5. The adapter of claim 2, wherein changing the format of the message comprises changing the encoding of data within the payload of the message.

6. The adapter of claim 5, wherein the message is changed between non-return-to-zero (NRZ) bit coding and the return-to-zero (RZ) bit coding.

7. The adapter of claim 1, wherein transmitting the change of the format comprises transmitting an encrypted message.

8. The adapter of claim 1, the adapter comprising:
   a processor board comprising the processor and the power circuit; and
   an interface board comprising the first connector and the second connector; wherein the processor board and the interface board are connected by a board-to-board connector.

9. The adapter of claim 8, wherein the processor board and the interface board are configured to decouple.

10. The adapter of claim 8, wherein the board-to-board connector is a card edge connector.

11. The adapter of claim 1, comprising one or more passed-through data lines; wherein the one or more passed-through data lines are directly connected between the first connector to the second connector without connecting to the processor.

12. The adapter of claim 1, wherein the first connector is configured to connect to a network; wherein the second connector is configured to connected to an embedded device.

13. The adapter of claim 1, wherein the processor comprises at least one of field programmable gate array (FPGA) or a microcontroller.

14. The adapter of claim 1, wherein the program instructions are maintained in at least one of software or firmware.

15. A system comprising:
   a network;
   an embedded device; and
   an adapter; wherein the adapter comprises:
      a first connector; wherein the first connector is connected to the network;
      a second connector; wherein the second connector is connected to the embedded device;
      a power circuit; a tapped power and ground line; wherein the tapped power and ground line are connected from the first connector to the power circuit and to the second connector in parallel;
      a processor; and one or more tapped data lines; wherein the one or more tapped data lines are connected from the first connector to the second connector via the processor;

wherein the processor is configured to execute program instructions causing the processor to:

receive a message from the network over the first connector via the one or more tapped data lines or from the embedded device over the second connector via the one or more tapped data lines; wherein the message is a controller area network (CAN) message;

change a format of the message; wherein changing the format of the message comprises reassigning an arbitration scheme of the message; wherein the arbitration scheme of the message is reassigned between bitwise arbitration schemes;

transmit the change of the format to the network over the first connector via the one or more tapped data lines or to the embedded device over the second connector via the one or more tapped data lines; and transmit the message using the format to the network over the first connector via the one or more tapped data lines or to the embedded device over the second connector via the one or more tapped data lines.

16. The system of claim 15, wherein changing the format of the message additionally comprises at least one of changing a layout of a payload or a data field of the message, or changing an encoding of data within the payload of the message.

17. The system of claim 15, comprising a plurality of embedded devices and a plurality of adapters.

18. A processor board comprising:

a board-to-board connector;

a power circuit;

a tapped power and ground line connected from the board-to-board connector to the power circuit;

a processor; and one or more tapped data lines; wherein the one or more tapped data lines are connected from the board-to-board connector to the processor;

wherein the processor is configured to execute program instructions causing the processor to:

receive a message over the board-to-board connector via the one or more tapped data lines; wherein the message is a controller area network (CAN) message;

change a format of the message; wherein changing the format of the message comprises reassigning an arbitration scheme of the message; wherein the arbitration scheme of the message is reassigned between bitwise arbitration schemes;

transmit the change of the format over the board-to-board connector via the one or more tapped data lines; and transmit the message using the format over the board-to-board connector via the one or more tapped data lines.

19. The processor board of claim 18, wherein changing the format of the message additionally comprises at least one of changing a layout of a payload or a data field of the message, or changing an encoding of data within the payload of the message.

* * * * *